United States Patent Office 3,814,805
Patented June 4, 1974

---

3,814,805
CYCLOPROPANE CARBOXYLIC ACID ESTERS AS INSECTICIDES
John Mervyn Osbond, Hatfield, and James Charles Wickens, St. Albans, England, assignors to Hoffmann-La Roche Inc., Nutley, N.J.
No Drawing. Original application Apr. 27, 1971, Ser. No. 139,296, now Patent No. 3,761,506. Divided and this application Sept. 12, 1972, Ser. No. 288,463
Claims priority, application Great Britain, June 8, 1970, 27,581/70
Int. Cl. A01n 9/24
U.S. Cl. 424—306     6 Claims

ABSTRACT OF THE DISCLOSURE

Cyclopropane carboxylic acid esters of phenoxybutynyl alcohols. The phenyl ring may include a chloro or lower alkyl substituent. The esters are useful as insecticides.

---

This is a division of application Ser. No. 139,296 filed Apr. 27, 1971 entitled Cyclopropane Carboxylic Acid Esters, now U.S. Pat. No. 3,761,506.

SUMMARY OF THE INVENTION

In accordance with this invention, it has been found that esters of the formula:

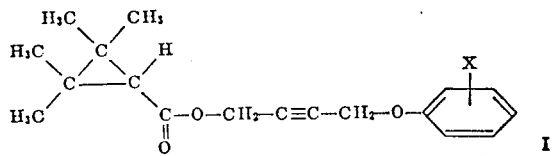

wherein X is hydrogen, lower alkyl, or chlorine;

are useful as insecticides.

The compounds of formula I are prepared by reacting an acid halide of the formula:

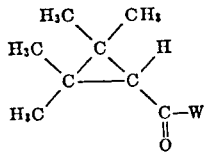

wherein W is chlorine or bromine;

with an alcohol of the formula:

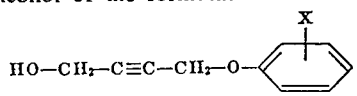

wherein X is as above.

The compounds of formula I are also prepared by reacting a salt having the formula:

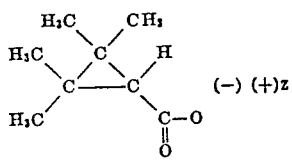

wherein Z is an alkali metal, silver or triloweralkylammonium;

with a halide of the formula:

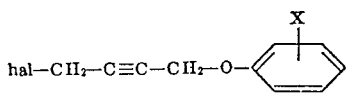

wherein X is as above and hal is a halogen.

The compounds of formula I are further prepared by reacting a compound of the formula:

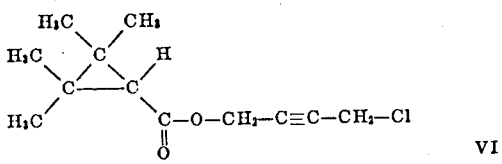

with a compound of the formula:

wherein X is as above and M is an alkali metal.

DETAILED DESCRIPTION OF THE INVENTION

The term "lower alkyl," as used throughout this application, comprehends both straight-chain and branched-chain saturated alkyl hydrocarbon groups containing from 1 to 6 carbon atoms such as methyl, ethyl, butyl, and isopropyl, with methyl being preferred.

The term "halogen" or "halo," as used herein, when not expressly stated otherwise, includes all four halogens, i.e., bromine, chlorine, fluorine and iodine, with chlorine being preferred.

The term "alkali metal," as used herein, comprehends the alkali metals of the first group of the periodic chart, such as sodium, potassium and lithium, with sodium being preferred.

The term "triloweralkylammonium," as used herein, means the cation of the reaction salt of a carboxylic acid and a triloweralkylamine. By "triloweralkylamine," as just used, is meant that each of the three alkyl groups attached to the amine nitrogen is a "lower alkyl," as defined above. The term "triloweralkylammonium" includes cations such as triethylammonium and tri-isopropylammonium.

As mentioned above, the esters provided by this invention are useful as insecticides. They are active against a variety of insects (particularly against *Musca domestica*) Furthermore, these esters have been found to have a very low mammalian toxicity. For example, 4-phenoxy-2-butynyl-2,2,3,3-tetramethylcyclopropane carboxylic has an $LD_{50}$ of greater than 1600 mg./kg. *per os* in mice, and 4-(4-chlorophenoxy)-2-butynyl - 2,2,3,3 - tetramethyl-cyclopropane carboxylate has an $LD_{50}$ of 1600 mg./g. *per os* in mice. These esters have shown an activity against *Musca domestica* on the order of that of pyrethrin extract and DDT, and they have also shown an activity against bean aphids, Colorado beetle, red spider mites and codlin moth.

The esters of the invention can be used in the form of insecticidal compositions which contain them in association with a compatible carrier material. Such insecticidal compositions can be made up in liquid form (e.g. as a sprayable solution or suspension) or in solid form (e.g. as as dust or granulate), either of which includes therewith a compatible carrier. The term "compatible carrier" is used in this specification to mean a substance which is inert towards the esters of formula I, which can be used to dissolve, disperse or diffuse the esters without impairing their effectiveness and which does not permanently damage the environment to which it is applied (e.g. crops, soil, equipment, etc.). For example, liquid compositions can be extended with water and dusts and granulates can be extended with inert solid carriers. Where a solid carrier is used in the preparation of insecticidal compositions, the carrier may be talc, finely powdered clay, silica or any similar carrier which does not bring about decomposition of the esters. Where the esters of formula I are formulated into liquid compositions, such compositions can include emulsifiers and/or acceptable organic solvents. If desired, the compositions can also contain conventional additives such as wetting agents or the like, as well as other insecticidally-active compounds and/or synergists.

An effective amount of an insecticidal composition can be applied to an insect-infested area using any conventionally accepted method such as spraying, dusting, etc. Desirably, solid compositions and liquid compositions contain from about 0.5% to 25% (preferably from about 1% to 10%) by weight of an ester of formula I. The choice of concentration of an ester of formula I and the rate of application to the insect-infested area will, of course, depend on several factors; for example, the type and maturity of insects present, the type of composition applied and the mode of application.

It will be appreciated that the insecticidal compositions can take the form of concentrates (e.g. wettable powders or emulsion concentrates) suitable for storage and containing, for example, from about 10% to 80% by weight of an ester of formula I. The concentrate can be diluted with the same or a different carrier to a concentration suitable for application to an insect-infested area. Emulsion concentrates can be prepared, for example, by dissolving an ester of formula I in an acceptable organic solvent and adding an emulsifier which is soluble in the organic solvent.

Any organic solvent can be used including hydrocarbons (e.g., toluene and xylene), chlorinated hydrocarbons (e.g., perchloroethylene), ketones, esters, etc. or mixtures thereof. Preferably, the solvent should be water immiscible, and the especially preferred solvents are aromatic hydrocarbons and ketones.

Surfactants are useful as emulsifiers, and when used, they suitably constitute from about 5% to 15% by weight of and emulsion concentrate. Preferably, the surfactants should be non-ionic.

In accordance with this invention, among the preferred compounds of formula I are the esters having the formula:

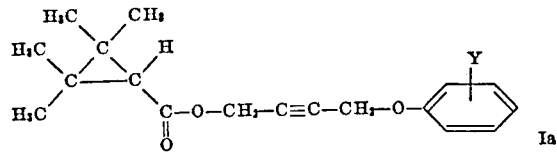

wherein Y is hydrogen or lower alkyl substituted in the ortho or para positions.

Among the particularly preferred compounds of formula I are included the following compounds of formula Ia:

4-(2-methyl-phenoxy)-2-butynyl-2,2,3,3-tetramethyl-cyclopropane carboxylate;
4-(4-methyl-phenoxy)-2-butynyl-2,2,3,3-tetramethyl-cyclopropane carboxylate; and
4-phenoxy-2-butynyl-2,2,3,3-tetramethyl-cyclopropane carboxylate.

Also among the preferred compounds of formula I, in accordance with this invention, are the esters having the formula:

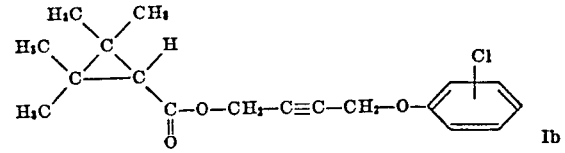

Among the particularly preferred compounds of formula I are included the following compounds of formula Ib:

4-(2-chloro-phenoxy)-2-butynyl-2,2,3,3-tetramethyl-cyclopropane carboxylate and
4-(4-chloro-phenoxy)-2-butynyl-2,2,3,3-tetramethyl-cyclopropane carboxylate.

Among the particularly preferred compound of formula I, quite particularly preferred is 4-phenoxy-2-butynyl-2,2,-3,3-tetramethyl-cyclopropane carboxylate.

One method for preparing the compounds of formula I involves reacting an acid chloride or bromide of formula II with an alcohol of formula III.

The acid chloride and acid bromide starting materials of formula II are known substances. They can be conveniently prepared by first reacting tetramethyl-ethylene with methyl or ethyl diazoacetic acid ester in the presence of copper powder or anhydrous copper sulfate, using excess tetramethyl-ethylene or toluene as the solvent, and subsequently chlorinating or brominating the resulting 2,2,3,3 - tetramethyl-cyclopropane carboxylic acid with thionyl chloride, phosphorus tribromide, or the like. In this reaction, anhydrous copper sulfate is the preferred reagent and toluene is the preferred solvent. The acid chlorides are the preferred starting materials of formula III.

The alcohol starting materials of formula III can be prepared, for example, by reacting a halo-butynol of the formula:

wherein hal is as above, preferably chlorine; with an alkali metal salt of a phenol of formula VII, hereinbefore, preferably a sodium salt. In carrying out this reaction, temperature and pressure are not critical, and the reaction can be carried out at room temperature (about 25° C.). Generally, it is preferred to carry out this reaction at an elevated temperature. A temperature of between 50° C. and 70° C. is especially preferred. The reaction can be carried out in any conventional inert organic solvent, preferably a lower alkanol, methanol and ethanol being especially preferred lower alkanols.

The reaction of an acid halide starting material of formula II with an alcohol starting material of formula III is conveniently carried out in the presence of an acid-binding agent. In this reaction, any conventional acid-binding agent can be used. Among the preferred acid-binding agents are alkali metal carbonates, such as sodium carbonate, alkali metal bicarbonates, such as sodium bicarbonate, and tertiary organic amines, such as triethylamine-pyridine and the like. An especially preferred acid-binding agent is pyridine. This reaction is conveniently carried out in the presence of an inert organic solvent. Any conventional inert organic solvent can be used. Among the preferred solvents, are included hydrocarbons, such as benzene, toluene or xylene, ethers such as diethyl ether or dioxane, and halogenated hydrocarbons, such as methylene chloride, chloroform or the like. In carrying out this reaction, temperature and pressure are not critical, and this reaction can be carried out at room temperature. Generally, it is preferred to carry out this reaction at a temperature within the approximate range of from 0° C. to 30° C., with about 20° C. being especially preferred. The reaction is also preferably carried out under the atmosphere of an inert gas. Any conventional inert gas may suitably be used, with nitrogen or argon being particularly preferred.

Another method for preparing the compounds of formula I involves reacting the alkali metal salt, the silver salt or the triloweralkylamine salt of a cyclopropane carboxylic acid of formula IV with a halide of formula V.

The alkali metal and triloweralkylamine salts of formula IV can be prepared, for example, by treating 2,2,3,3-tetramethyl-cyclopropane carboxylic acid in an inert organic solvent with a dilute aqueous alkali metal hydroxide solution or a triloweralkylamine. In carrying out this reaction, any conventional inert organic solvent can be utilized which is compatible with the amine or with the hydroxide solution, as the case may be. Among the preferred solvents are the lower alkanols, with ethanol being especially preferred. In carrying out this reaction, any alkali metal hydroxide or triloweralkylamine can be utilized. Among the preferred hydroxides and amines are the sodium and potassium hydroxides and triethylamine. In carrying out this reaction, temperature and pressure are not critical, and the reaction can be carried out at room temperature.

The silver salts of formula IV can be prepared by treating alkali metal salt of formula IV, such as the sodium salt, in an aqueous solution with silver nitrate. In carrying out this reaction, temperature and pressure are not critical, and the reaction can be carried out at room temperature.

The halide starting materials of formula V can be prepared, for example, by reacting a dihalobutyne of the formula:

$$\text{hal—CH}_2\text{—C} \equiv \text{C—CH}_2\text{—hal} \qquad \text{IX}$$

wherein hal is as above, preferably chlorine;

with an alkali metal salt of a phenol of formula VII. The reaction is suitably carried out in an inert organic solvent. Any conventional inert organic solvent can be used, with a lower alkanol being preferred, methanol and ethanol being especially preferred. In carrying out this reaction, temperature and pressure are not critical. Generally in carrying out this reaction, an elevated temperature is preferred, with a temperature of from 50° C. to 70° C. being especially preferred.

The halide starting materials of formula V can also be prepared, for example, by treating an alcohol starting material of formula III with a halogenating agent. Any conventional halogenating agent can be utilized in this reaction, with thionyl chloride or phosphorus tribromide in pyridine being preferred.

The reaction of an alkali metal salt, a silver salt or a triloweralkylamine salt of 2,2,3,3 - tetramethyl-cyclopropane carboxylic acid, of formula IV, with a halide of formula V is suitably carried out in an inert organic solvent. In this reaction, any conventional inert organic solvent can be utilized with a ketone, such as acetone or methyl ethyl ketone, or high-boiling ether, such as diglyme being preferred. In carying out this reaction, temperature and pressure are not critical. Generally, it is preferred to carry out the reaction at an elevated temperature, the reflux temperature of the reaction mixture being especially preferred. It is also preferred to carry out this reaction under the atmosphere of an inert gas. In this reaction, the selection of the inert gas is not critical, nitrogen or argon being particularly preferred.

Still another method for preparing the compounds of formula I involves reacting a compound of formula VI with an alkali metal salt of a phenol of formula VII.

The starting materials of formula VI can be prepared, for example, by reacting an acid chloride or bromide of formula II with 4-chloro-2-butyn-1-ol. The reaction can be carried out under similar conditions to those described earlier in connection with the reaction of an acid chloride or bromide starting material of formula II with an alcohol starting material of formula III.

The alkali metal salts of the phenols of formula VII are known and can be prepared by conventional methods.

The reaction of a starting material of formula VI with an alkali metal salt of a phenol of formula VII can suitably be carried out in the presence of an inert organic solvent. In this reaction, any conventional inert organic solvent can be utilized, such as a hydrocarbon, a highboiling ether or a halogenated hydrocarbon. Benzene, toluene, and xylene, are the preferred hydrocarbons, diglyme is the preferred ether, and chloroform and methylene chloride are the preferred halogenated hydrocarbons. In carrying out this reaction, temperature and pressure are not critical. Generally, it is preferred to carry out the reaction at an elevated temperature, with the reflux temperature of the reaction mixture being especially preferred. Also, it is preferred to carry out the reaction under the atmosphere of an inert gas. In this reaction, any conventional inert gas may be utilized, with nitrogen or argon being particularly preferred.

The following examples illustrate the compounds of the invention. All temperatures are in degree centigrade.

Example 1

7.4 g. (0.0457 mol) of 4-phenoxy-2-butyn-1-ol was dissolved in 65 ml. of dry benzene and 7.5 ml. of dry pyridine was added to the solution obtained. To this solution, there was added dropwise with stirring under a nitrogen atmosphere at 23° C. over a period of 0.5 hours a solution of 7.3 g. (0.0455 mol) of 2,2,3,3-tetramethyl-cyclopropane carboxylic acid chloride dissolved in 50 ml. of dry benzene. The mixture was stirred at ambient temperature (25° C.) for 16 hours. The precipitated pyridine hydrochloride was filtered off and washed with benzene. The combined benzene solutions were washed twice with 5-N hydrochloric acid, once with water, twice with 2-N sodium hydroxide solution, twice with 2-N hydrochloric acid, twice with saturated, aqueous sodium bicarbonate solution and twice with saturated, aqueous sodium chloride solution and then dried over anhydrous sodium sulphate. The sodium sulphate was filtered off, the filtrate was evaporated under reduced pressure, and the resulting syrup was distilled under high vacuum to yield 10.3 g. of 4-phenoxy-2-butynyl-2,2,3,3-tetramethyl-cyclopropane carboxylate as a colorless liquid; boiling point (B.P.) 125°–127° C./10⁻⁴ mm. Hg; $n_D^{20}=1.5227$.

Example 2

10.5 g. (0.534 mol) of 4-(4-chloro-phenoxy)-2-butyn-1-ol was dissolved in 70 ml. of dry benzene, and 8.5 ml. of dry pyridine were added to the solution. To this solution, there was then added dropwise with stirring under a nitrogen atmosphere over a period of 5 hours at 20° C., a solution of crude 2,2,3,3-tetramethyl-cyclopropane carboxylic acid chloride, obtained by chlorinating 7.58 g. (0.534 mol) of the corresponding carboxylic acid, in 60 ml. of benzene. The mixture was then stirred at room temperature (25° C.) for 16 hours under a nitrogen atmosphere. The precipitated pyridine hydrochloride was filtered off and washed with benzene. The combined benzene solutions were washed twice with 5-N hydrochloric acid, once with water, three times with 2-N sodium hydroxide solution, once with 2-N hydrochloric acid, twice with saturated, aqueous sodium bicarbonate solution and twice with saturated, aqueous sodium chloride solution and then dried over anhydrous sodium sulphate. The sodium sulphate was filtered off and the filtrate was evaporated to a syrup under reduced pressure. The crude product was distilled twice to yield 8.3 g. of 4-(4-chlorophenoxy)-2-butynyl-2,2,3,3-tetramethyl-cyclopropane carboxylate as a colorless liquid; B.P. 140° C./~10⁻⁴ mm. Hg; $n_D^{20}=1.5329$.

Example 3

8.8 g. of 4-(4-methyl-phenoxy)-2-butyn-1-ol was dissolved in 80 ml. of dry benzene, and 8 ml. of dry pyridine was added to the solution. The resulting solution was then treated dropwise with stirring with a solution of crude 2,2,3,3-tetramethyl-cyclopropane carboxylic acid chloride, obtained by chlorinating 7.1 g. of the corresponding carboxylic acid with thionyl chloride, in 20 ml. of benzene. The mixture was stirred at 20° C. under a nitrogen atmosphere for 16 hours. The precipitated pyridine hydrochloride was filtered off and washed with benzene. The combined benzene solutions were washed twice with 5-N hydrochloric acid, once with saturated aqueous sodium chloride solution, twice with 2-N sodium hydroxide solution, once with 2-N hydrochloric acid, twice with saturated aqueous sodium bicarbonate solution and twice with saturated aqueous sodium chloride solution then dried over anhydrous sodium sulphate. The sodium sulphate was filtered off, the filtrate was evaporated and the residue was distilled under high vacuum to yield 11.65 g. of 4-(4-methyl-phenoxy)-2-butynyl-2,2,3,3-tetramethylcyclopropane carboxylate; B.P. 120°–126° C./10⁻⁴ mm. Hg; $n_D^{20}=1.5213$.

Example 4

By utilizing the procedure of Example 3, 4-(3-methyl-phenoxy)-2-butyn-1-ol was reacted with crude 2,2,3,3-tetramethyl-cyclopropane carboxylic acid to yield 4-(3-methyl-phenoxy)-2-butynyl - 2,2,3,3 - tetramethyl-cyclopropane carboxylate; B.P. 145° C./10⁻⁴ mm. Hg; $n_D^{20}=1.5215$.

Example 5

9.82 g. of 4-(3-chloro-phenoxy)-2-butyn-1-ol was dissolved in 80 ml. of dry benzene, and 8 ml. of dry pyridine was added to the solution. The resulting solution was then treated dropwise with stirring with a solution of crude 2,2,3,3-tetramethyl-carboxylic acid chloride, obtained by chlorinating 7.1 g. of the corresponding carboxylic acid with thionyl chloride in 20 ml. of benzene. The mixture was stirred at 20° C. for 16 hours under a nitrogen atmosphere. The precipitated pyridine hydrochloride was filtered off and washed with benzene. The combined benzene solutions were washed twice with 5-N hydrochloric acid, once with water, twice with 2-N sodium hydroxide solution, once with 2-N hydrochloric acid, twice with saturated aqueous sodium bicarbonate solution and twice with saturated aqueous sodium chloride solution and then dried over anhydrous sodium sulphate. The sodium sulphate was filtered off, the filtrate was evaporated and the residue was distilled under high vacuum to yield 12.35 g. of 4-(3-chloro-phenoxy)-2-butynyl-2,2,3,3-tetramethyl-cyclopropane carboxylate as an oil; B.P. 124°-132° C./10⁻³ mm. Hg; $n_D^{20}=1.5304$.

Example 6

7.1 g. of 2,2,3,3-tetramethyl-cyclopropane carboxylic acid was dissolved in 100 ml. of ethanol, and the solution was treated with 2-N sodium hydroxide solution until the mixture had a pH of 7. The mixture was evaporated under reduced pressure, and the residue was codistilled twice with ethanol and three times with benzene to constant weight. This yielded the sodium salt of 2,2,3,3-tetramethyl-cyclopropane carboxylic acid.

The foregoing sodium salt was suspended in 400 ml. of dry diglyme and treated with 9.0 g. of 1-chloro-4-phenoxy butyne. The mixture was heated at 140° C. with stirring for 6.5 days under a nitrogen atmosphere. The diglyme was removed under reduced pressure, and the residue was treated with a mixture of water and diethyl ether and then extracted with diethyl ether. The extracts were washed twice with 2-N sodium hydroxide solution, once with saturated aqueous sodium bicarbonate solution, twice with water and twice with saturated aqueous sodium chloride solution and then dried over anhydrous sodium sulphate solution. Removal of the sodium sulphate by filtration, evaporation of the filtrate and distillation of the residue in high vacuum yielded 7.05 g. of 4-phenoxy-2-butynyl-2,2,3,3-tetramethyl-cyclopropane carboxylate as an oil; B.P. 140–150° C./10⁻⁴ mm. Hg; $n_D^{20}=1.5227$.

Example 7

10.7 g. of 2,2,3,3-tetramethyl-cyclopropane carboxylic acid in 25 ml. of petroleum ether was treated at room temperature (25° C.) with 7.5 ml. of redistilled thionyl chloride and 2 drops of dimethylformamide. After 1.5 hours, all of the carboxylic acid had dissolved. The solution was then evaporated, and the residue was codistilled with benzene to yield 2,2,3,3-tetramethyl-cyclopropane carboxylic acid chloride.

7.83 g. of 4-chloro-2-butyn-1-ol in 100 ml. of dry benzene and 12 ml. of pyridine were treated under a nitrogen atmosphere with a solution of the acid chloride prepared as described in the preceding paragraph in 20 ml. of benzene. The mixture was stirred for 1 hour at room temperature, and the precipitated pyridine hydrochloride was filtered off and washed with benzene. The combined benzene solutions were washed twice with 5-N hydrochloric acid, twice with 2-N sodium hydroxide solution, once with 2-N hydrochloric acid, twice with saturated aqueous sodium bicarbonate solution and twice with saturated aqueous sodium chloride solution and then dried over anhydrous sodium sulphate. Removal of the sodium sulphate by filtration, evaporation of the filtrate and distillation of the residue under high vacuum yielded 10.0 g. of 4 - chloro - 2 - butynyl-2,2,3,3-tetramethyl-cyclopropane carboxylate; B.P. 115°–120° C./0.7 mm. Hg: $n_D^{20}=1.4900$.

0.57 g. of sodium dissolved in 50 ml. of dry ethanol was treated with a solution of 2.35 g. of phenol in 20 ml. of dry ethanol, and the mixture was left to stand for 2 hours. Then, the ethanol was removed by evaporation and the residue was codistilled three times with benzene to yield a white powder, the sodium salt of phenol.

The foregoing sodium salt was suspended in 100 ml. of dry diglyme, and 5.71 g. of 4-chloro-2-butynyl-2,2,3,3-tetramethyl-cyclopropane carboxylate was added thereto. The mixture was heated at 120° C. for 48 hours under a nitrogen atmosphere. The precipitated sodium chloride was then filtered off. The solution was then evaporated under a water-pump vacuum and water was added to the residue. The mixture was then extracted three times with diethyl ether, and the combined diethyl ether extracts were washed once with 2-N sodium hydroxide solution and twice with saturated aqueous sodium chloride solution and dried over anhydrous sodium sulphate. Removal of the sodium sulphate by filtration, evaporation of the filtrate and distillation of the residue under high vacuum yielded 3.95 g. of 4-phenoxy-2-butynyl-2,2,3,3-tetramethyl-cyclopropane carboxylate; B.P. 140–145° C./10⁻⁴ mm. Hg; $n_D^{20}=1.5227$.

The following examples illustrate insecticidal compositions containing the esters of the invention.

Example 8

2.5 g. of 4-phenoxy-2-butynyl-2,2,3,3-tetramethyl-cyclopropane carboxylate was dissolved in sufficient kerosene to give a final volume of 100 ml. The resulting solution was suitable for use as a spray.

Example 9

5 g. of 4-(4-chloro-phenoxy)-2-butynyl-2,2,3,3-tetramethyl-cyclopropane carboxylate was well mixed with 5 g. of lignin sulphonate and 90 g. of kaolin. The mixture was thoroughly stirred in a mortar while 10 ml. of water was added, then the moist was further stirred and subsequently granulated in a granulator. After drying in air, there were obtained granules containing 5% of active ingredient.

Example 10

20 g. of 4-phenoxy-2-butynyl-2,2,3,3-tetramethyl-cyclopropane carboxylate, 10 g. of nonoxylon-15 (a non-ionic surfactant) and 70 g. of xylene were thoroughly mixed to give a solution which can be used as an emulsifiable concentrate. Before use, the emulsifiable concentrate was emulsified in sufficient water to give a ten-fold dilution.

We claim:
1. An insecticide composition comprising an insecticidally effective amount of a compound of the formula:

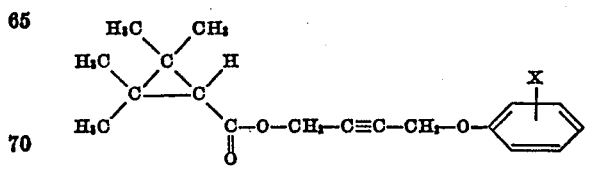

wherein X is hydrogen, lower alkyl, or chlorine; and an inert carrier material.

2. The composition of claim 1 wherein said compound has the formula:

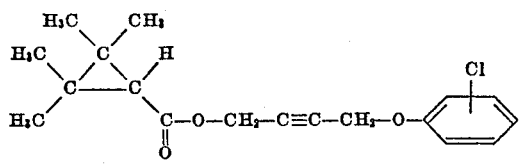

3. The composition of claim 1 wherein said compound has the formula:

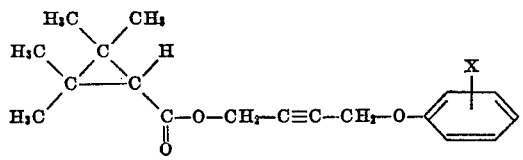

wherein X is hydrogen or lower alkyl substituted in the ortho or para positions.

4. The composition of claim 1 wherein said compound comprises between about .5% by weight and 25% by weight of said composition.

5. The composition of claim 4 wherein said compound comprises 1% by weight to 10% by weight of said composition.

6. A method for combatting insects selected from the group consisting of *Musca domestica*, bean aphid, Colorado beetle, red spider mite, and codlin moth, which comprises contacting said insects with an insecticidally effective amount of a compound of the formula:

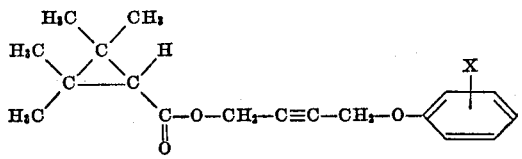

wherein X is hydrogen, lower alkyl, or chlorine.

References Cited
UNITED STATES PATENTS 3,683,005   8/1972   Sota et al. _____ 260—468

VINCENT D. TURNER, Primary Examiner

U.S. Cl. X.R.

260—468 H